No. 610,782. Patented Sept. 13, 1898.
F. J. WICH.
SPEED AND DISTANCE INDICATOR AND RECORDER FOR VELOCIPEDES, &c.
(Application filed Nov. 4, 1897.)

(No Model.) 5 Sheets—Sheet 1.

Witnesses:
Inventor:
F. J. Wich.
by Herbert W. T. Jenner
Attorney

No. 610,782. Patented Sept. 13, 1898.
F. J. WICH.
SPEED AND DISTANCE INDICATOR AND RECORDER FOR VELOCIPEDES, &c.
(Application filed Nov. 4, 1897.)

(No Model.) 5 Sheets—Sheet 3.

No. 610,782. Patented Sept. 13, 1898.
F. J. WICH.
SPEED AND DISTANCE INDICATOR AND RECORDER FOR VELOCIPEDES, &c.
(Application filed Nov. 4, 1897.)

(No Model.) 5 Sheets—Sheet 5.

Witnesses:
Inventor:
F. J. Wich.
by Herbert W. T. Jenner
Attorney.

UNITED STATES PATENT OFFICE.

FERDINAND JOHN WICH, OF DIDSBURY, ENGLAND.

SPEED AND DISTANCE INDICATOR AND RECORDER FOR VELOCIPEDES, &c.

SPECIFICATION forming part of Letters Patent No. 610,782, dated September 13, 1898.

Application filed November 4, 1897. Serial No. 657,388. (No model.)

*To all whom it may concern:*

Be it known that I, FERDINAND JOHN WICH, a subject of the Queen of Great Britain, residing at Didsbury, in the county of Lancaster, England, have invented certain new and useful Improvements in Speed and Distance Indicators and Recorders for Velocipedes, Vehicles, and other Rolling-Stock; and I do hereby declare the following to be a full, clear, and exact description of the invention, such as will enable others skilled in the art to which it appertains to make and use the same.

My invention relates to an instrument or mechanism for indicating and registering or recording the speed per minute or hour at which a velocipede, vehicle, or other description of rolling-stock for road or track is traveling and the mileage traveled.

The object of my invention is to provide a novel and efficient instrument of small compass for indicating on a dial the speed at which a bicycle or vehicle to which it is applied is traveling over the ground and for recording or giving a permanent register thereof, with all the variations in speed from zero to the full limit attained, and of the number of miles which the bicycle or vehicle has run.

My invention consists of the novel arrangement, construction, and operation of mechanism for the aforesaid purpose, as will be hereinafter fully described.

Figure 1:
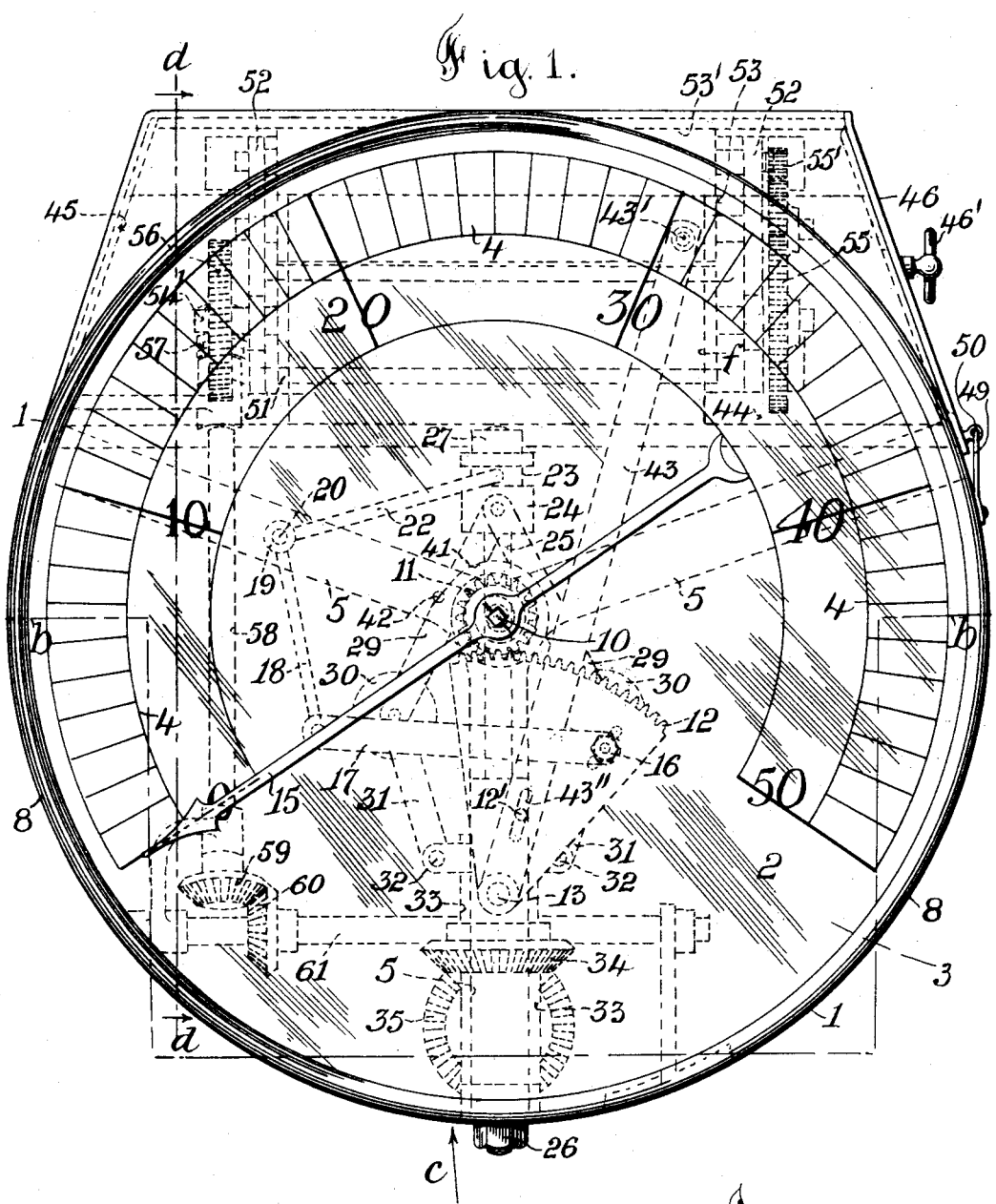
Figure 2:
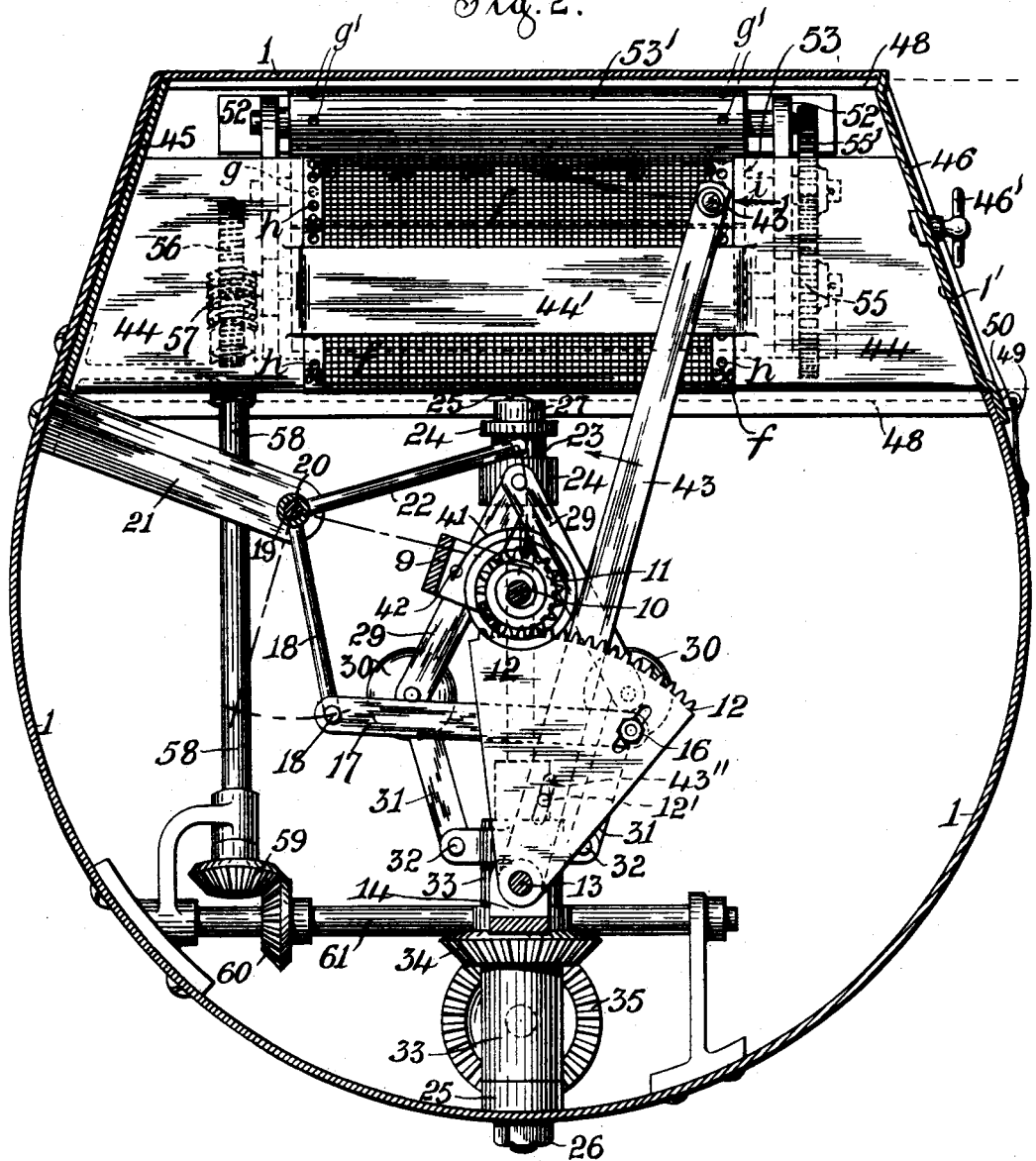
Figure 3:
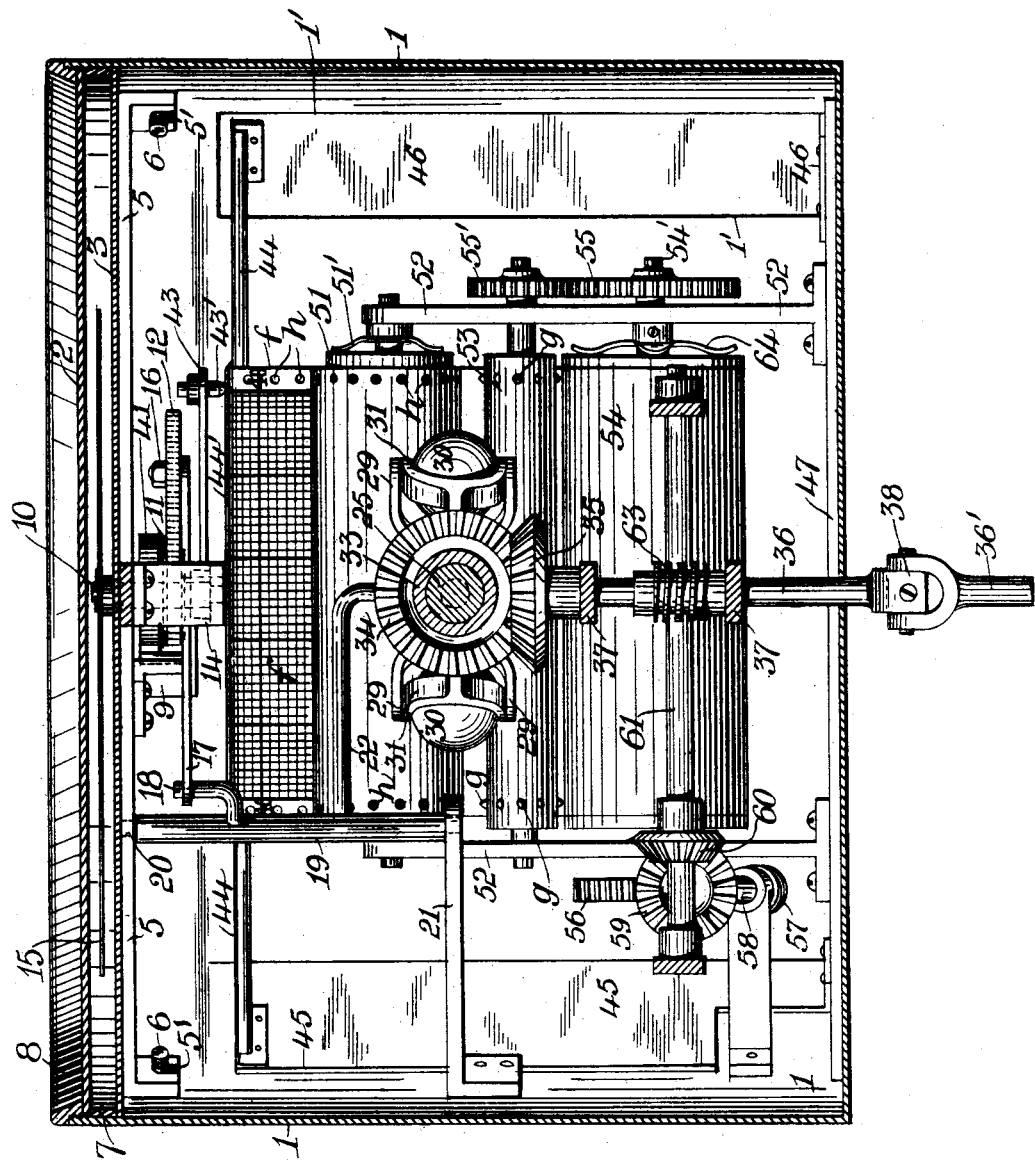
Figure 4:
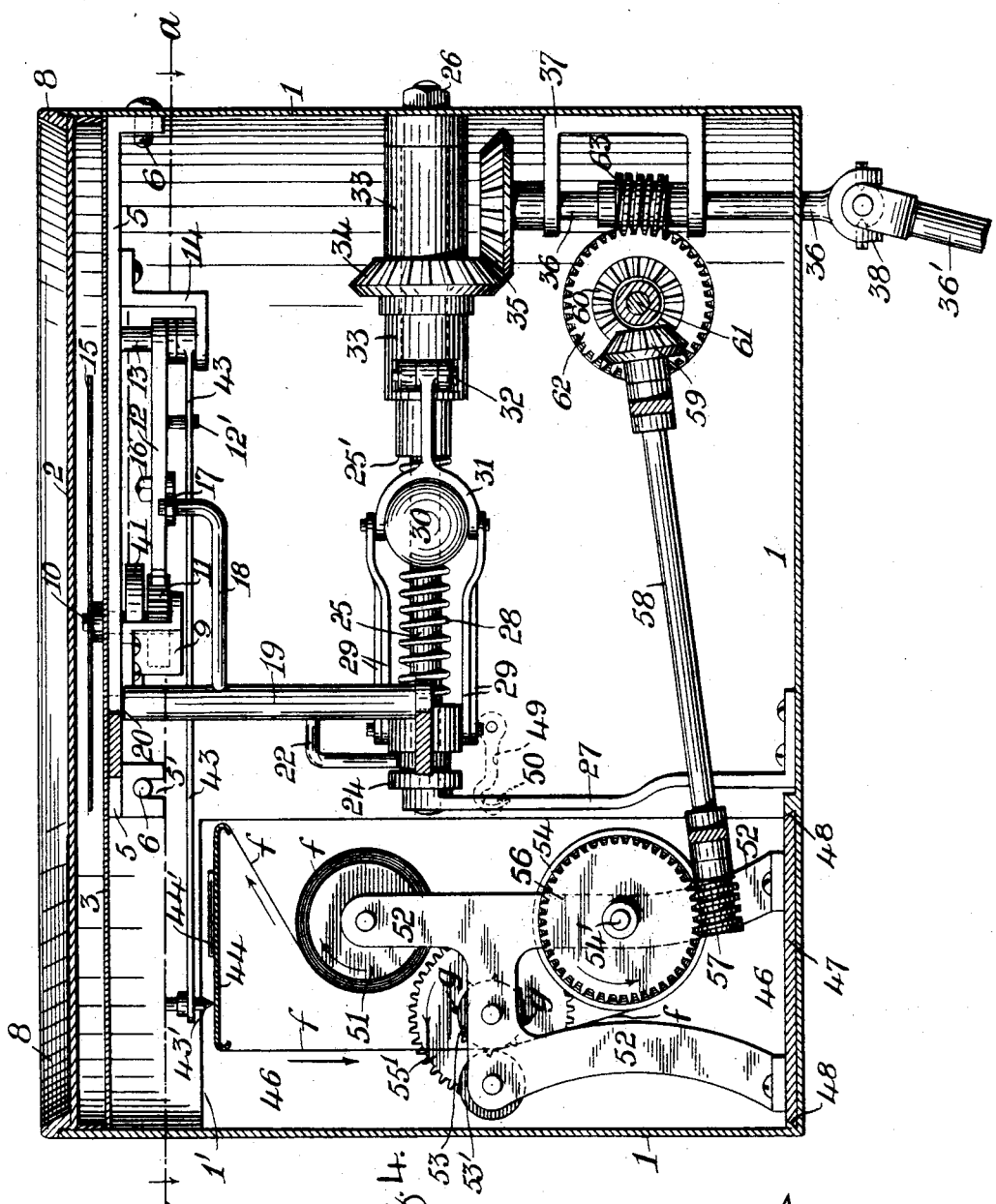
Figure 5:
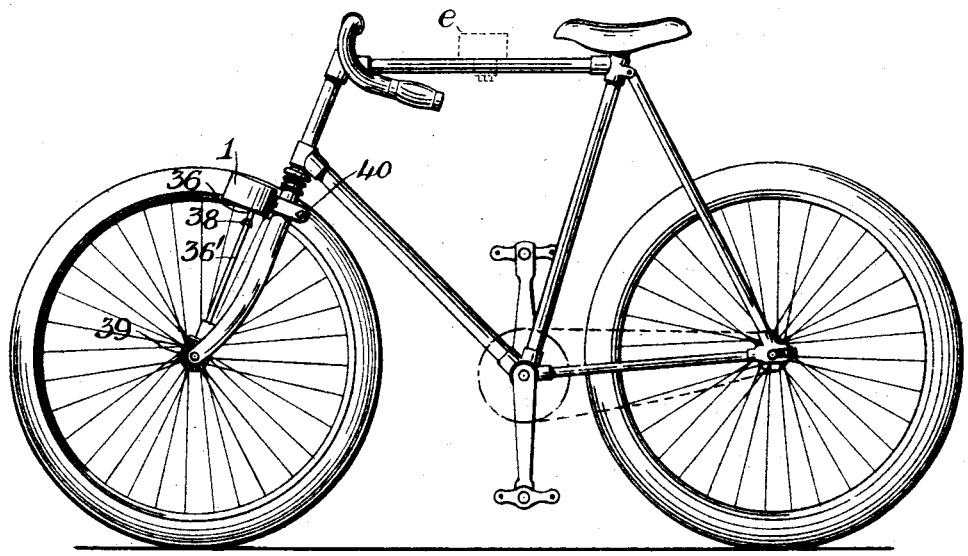
Figure 6:
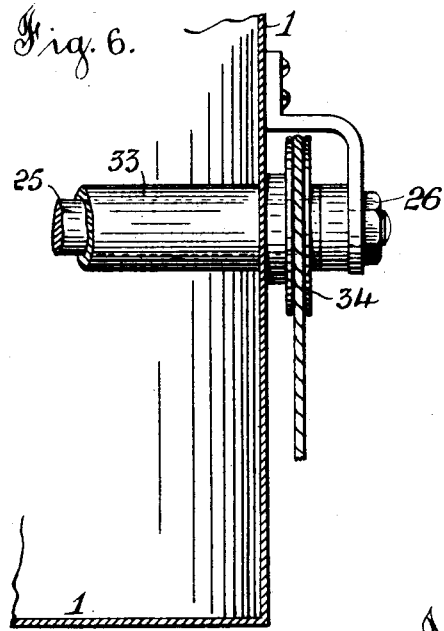

Referring to the drawings illustrating my invention, Figure 1 is a plan view, on an enlarged scale, of my improved registering and indicating or recording instrument. Fig. 2 is a sectional plan taken on line $a\,a$ of Fig. 4. Fig. 3 is a sectional elevation taken on line $b\,b$ of Fig. 1, looking in the direction of arrow C, same figure. Fig. 4 is a sectional elevation taken on line $d\,d$ of Fig. 1. Fig. 5 is an elevation of a bicycle, showing the application of my invention; and Fig. 6 is a modified detail of the method of conveying motion to the instrument.

The same letters and numerals indicate corresponding parts in all the figures.

In the drawings, 1 represents a case or box inclosing the mechanism of the instrument; 2, a glass disk forming the top of the box or case, through which can be plainly seen below a dial-plate 3, having thereon a graduated scale 4, arranged on the arc of a circle and marked off radially by divisions representing units and tens from zero to fifty.

The dial-plate 3 is supported by a bridge-piece 5, which is held securely in position at the desired height by studs 6, secured in the sides of the case 1, these studs entering and registering in slots 5', formed in the turned-down extremities of the said bridge-piece.

On the dial-plate is placed a ring or washer 7, forming a distance-piece, and on this ring rests the glass disk 2, which is secured in the casing by a rim 8, having an external screw-thread thereon which takes into a corresponding internal thread on the upper inner edge of the case or box 1. The screwed rim 8 makes a dust-proof joint with the top of the case 1.

Journaled loosely in bearings, at one end in the bridge-piece 5 and at the lower end in a bracket 9, secured to said bridge-piece, is a short shaft or spindle 10, whereon is fast a pinion 11, with which meshes a toothed quadrant or sector 12, mounted loosely on a stud 13, supported in bearings at the upper end in the bridge-piece 5 and at the lower end in a bracket 14, secured to said bridge-piece. The shaft or arbor 10 projects through the bridge-piece 5 and dial-plate 3, and to its upper end is secured an index-finger or pointer 15, which is adapted to be moved over the scale 4 from "0" to "50."

To the sector or quadrant 12 is secured by nut 16 one end of an arm 17, whose opposite end is provided with an opening through which is passed the bent end of a lever 18, secured to a sleeve 19, adapted to turn on a stud 20, secured at its upper end to the bridge-piece 5 and at its lower end to the bracket 21, attached to the side of the case 1. To the sleeve 19 is secured a second lever 22, whose extremity is bent down at right angles, the end thereof entering an annular groove 23 in a collar 24, adapted to slide laterally and to rotate on a fixed stud 25, secured at its outer end by nut 26 to the case 1 and supported at its inner end by a stand 27. On the stud 25 and confined between the sliding collar 24 and a shoulder 25' is a spiral spring 28, which acts in resistance to the lateral movement of the collar.

The sliding collar 24 is connected by links 29 to governor-balls 30, which are carried in the forked ends of levers 31, centered on studs 32, secured in lugs cast on a sleeve 33, placed loosely in the fixed stud 25 so as to turn freely thereon, but not to move laterally. On the said sleeve is fast a bevel-gear 34, which meshes with a second bevel-gear 35, secured on a vertical shaft 36, supported in bearings in a bracket 37, secured to the case 1. The lower end of the shaft 36 projects through an opening in the bottom of the case or box 1 and is coupled by a knuckle or universal joint 38 to a shaft 36', of which it forms a continuation or part, and together constitute the driving-shaft by which motion is transmitted from a rotating part of the velocipede or vehicle to the instrument. The said driving-shaft is made in two parts and is jointed together, as described, in order to allow for any angularity there may be in consequence of the instrument not being in a position which will allow the part 36 of the driving-shaft to be central with the source of motion.

In Fig. 5 the shaft 36' is shown geared to a bevel-gear 39, fast on the hub of the front wheel of the bicycle, the instrument in this case being secured by a clamp and screw 40 to the front fork, as when geared to the steering-wheel it must be capable of turning therewith from side to side without offering any obstruction or impediment to the steering. Should the instrument be affixed to any other part of the machine, such as shown in dotted line at e in Fig. 5, the shaft 36' can be geared to the crank-axle or to the rear driving-wheel. The gear connection between shaft 36' and the rotating part of the bicycle gives a positive transmission of motion and is to be preferred; but the gear may be modified by substituting a strap or band connection as the medium for transmitting motion from the bicycle or vehicle to the instrument, the band passing around a grooved pulley on the wheel or crank-axle and around a grooved pulley 34, secured on the end of sleeve 33, as shown at Fig. 6, the bevel-gears 34 and 35 and shaft 36 36' being removed and the sleeve 33 extended through to the outside of the case 1.

The parts above described comprise the means for giving a constant visible register of the speed and every variation of speed at which the bicycle or vehicle to which it is connected is traveling, each rotation of the wheel or axle to which shaft 36' is geared being transmitted through gears 35 34 to the sleeve 33, which carries the governor-balls 30 around with it. As the speed of the sleeve increases the inertia of the governor-balls causes them to diverge or fly apart against the resistance of spring 28, acting on the collar 24, the degree of divergence being in proportion to the speed the bicycle is traveling, which is the determining factor. The divergence of the governor-balls draws outward the links 29 and levers 31, with the result that the collar 24 is drawn in the direction of the sleeve 33, this lateral movement of the collar turning lever 22, and consequently lever 18, on its center in the direction of the limits of motion denoted by strong broken lines in Fig. 2, the lever 18 drawing the quadrant or sector 12 with it, and thereby giving partial rotation to the pinion 11 and arbor 10, which latter carries the pointer or index-finger 15 from its normal position at zero forward over the scale 4, and the mark or division on same with which the pointer is brought into alinement, gives the speed at which the bicycle or vehicle is at the moment traveling over the ground. Thus if the pointer stops opposite the figure "10" marked on the scale the speed attained is approximately ten miles per hour, each unit representing one mile, so that up to fifty miles, above which it is rarely necessary to register, the instrument shows at a glance at any moment the speed the machine or vehicle is going, any fraction of a mile being gaged by the position of the pointer intermediate of two units-divisions, or the scale can be further marked off into halves and quarters. The graduations of the scale are shown at equal distances apart; but they are placed at any distances apart which will enable them to give a correct indication of the speed of the bicycle, according to the proportions of the parts of the speed-governor and the tension of the springs used in connection with it. When the machine or vehicle is brought to a standstill, the parts resume their normal positions, being assisted by spring 28 and also by a helically-coiled spring 41, secured at one end to the arbor 10 and at the opposite end to a split stud 42, secured to the bracket 9, and which is drawn tight or put in tension by the arbor 10 when rotated and uncoils itself again on the sector or quadrant being released and returned to its normal position. The spring 41 also prevents backlash of the teeth of the pinion 11 and sector 12.

The register given as above described is ever varying with the speed of the bicycle or vehicle and leaves no record. In order that a permanent record may also be made by the instrument for subsequent reference, I combine with the instrument means whereby an indication, chart, or diagram of the speed and distance traveled shall be produced. To this end I loosely mount on the stud 13, on which the quadrant or sector 12 turns, an arm 43, which extends over a table or platform 44, secured at each end to vertical end plates 45 46, attached to a base-plate 47, provided with beveled or inclined longitudinal edges which take into ways 48, formed on the bottom of the case or box 1, the said parts 45, 46, and 47 forming a frame or drawer which is adapted to be slid in and out of the case 1 through an opening 1' at one side of the case, the end plate 46 answering as a door for closing the opening 1' and having its edges curved slightly outward and made to overlap the sides of the opening 1', so that when pushed against same and secured by a hook 49, hinged to the side of the case 1 and hooking into an eyelet 50, fast to the plate 46, a tight joint is made which will exclude dust. The sliding drawer is provided in order that the recording strip or paper may be examined and when necessary removed and another length of paper substituted. The said recording-strip is wound on a roll 51, mounted at each end in bearings in stands 52, secured to the base-plate 47, which stands also support a pair of nipping or drawing rolls 53 53' and a take-up roll 54. The recording-strip (denoted by letter $f$) is unwound off the roll 51 by the drawing-rolls 53 53', a spring 51' preventing overwinding, said strip being then passed under a bridge or guide 44', formed by making two longitudinal cuts in the table 44 and stamping the cut portion a little above the surface of the table, so that it will maintain the strip in position. The spring 51' is mounted on the roll-shaft and bears against the shaft-bearing or any other stationary abutment and the end of the roll 51. After leaving the guide 44' the strip passes over the surface of the table 44, then between the rolls 53 53', and is finally wound on the take-up roll 54.

The roll 53 is driven positively by gear-wheels 55 55' from the shaft 54', which is driven by worm-wheel 56 and worm-gear 57 on worm-gear shaft 58, the said worm-gear shaft deriving its motion through bevel-gears 59 and 60 from cross-shaft 61, which is rotated through worm-wheel 62 and worm-gear 63 from the driving-shaft 36, the strip $f$ thus being traversed over the table 44 at a speed corresponding to the speed at which the machine or vehicle is traveling.

The take-up roll 54 is mounted loosely on shaft 54' and is rotated to wind on the paper strip by the frictional contact against one end thereof of a spring-plate or fingers 64, secured to the shaft 54, Fig. 3, by which means no excessive tension is placed on the strip, and it is wound on the roll just as it is fed forward by the drawing-rolls 53 53'.

The arm 43 carries at its forward end a pencil 43' or an instrument containing a supply of ink or which is smeared over with a marking fluid, the point of the pencil or marker being adjusted so as to press lightly against the table 44 and when carried over said table to make a mark on the paper recording-strip $f$. The rear end of the arm 43 is provided with a slot 43'', into which a stud 12', secured to the under side of the quadrant or sector 12, extends and engages with the sides thereof, or the quadrant and arm may be secured to the stud 13 and the stud 12' dispensed with. The movement of quadrant or sector 12 to the left hand, Figs. 1 and 2, in the manner first herein described causes the stud 12' to move the arm 43 on its center in the same direction, thereby drawing the pencil or marker 43' over the recording-strip $f$ from right to left to an extent corresponding to the degree of movement the quadrant or sector 12 receives from the diverging action of the governor, the pencil thus making a mark on the paper strip $f$ in the direction of its width and across the lines of division marked thereon to the line which corresponds with the division on the scale 4 to which the index-finger then points, whereby the speed of the bicycle or vehicle is recorded. The divisions marked off on the strip $f$ bear an exact proportion to the divisions on the scale 4, and the tens-divisions are indicated by plain figures at each end of the strip or at intervals thereon, as shown at Fig. 2. The lines traced on the strip $f$ are naturally of a wavy or zigzag character, as indicated at Fig. 2, and record every variation in speed from start to finish of each run. The same mechanism that registers or records the speed at which the machine or vehicle is propelled also registers or records the number of miles run. To secure this result, I mark off on the recording-strip $f$ at right angles to the speed divisions or lines horizontal lines or divisions representing miles and tens of miles, the distance or space between one units-division and another being equivalent or equal to the distance that the paper strip $f$ will be traversed by the drawing-rolls 53 53' while the wheel or axle of the bicycle or vehicle from whence the instrument is driven is making the number of revolutions calculated to cover one mile of ground. Thus by noting the mileage figure or divisional line on the recording-strip which happens to be in alinement with the marker 43' previous to starting on a journey and at the conclusion of the journey a correct reading of the number of miles covered thereon can be obtained, and the total number of miles traveled while the recording-strip is traversed from end to end is given at the end of the strip.

In order to prevent slipping of the recording-strip between the drawing-rolls 53 53' and to make the traverse of said strip at the same surface speed as the rolls certain, I prefer to secure small studs $g$ on, say, the roll 53 and form corresponding sockets $g'$ in its companion roll 53', or vice versa, the edges of the recording-strip having perforations $h$ made therein at the same distances apart as the studs, so that said studs will take into the perforations and traverse the paper strip positively and at the same speed as the driven roll 53.

The recording-strip is made of paper sufficiently strong to withstand the strain put upon it.

An arrow or gage-line $i$, Fig. 2, is marked on the table 44 exactly opposite the marker 43' when in its normal position, which serves as a guide or gage in placing a fresh recording-strip in the instrument, the strip being arranged so that the first horizontal line or division thereon is in alinement with the said mark or gage, and when the drawer is pushed home it will be directly under the marker 43'.

When wishing to read the recorded speed traced on the recording-strip $f$ or to remove a filled strip and replace it with a blank strip, the hook 49 is disengaged from the eyelet 50 and a finger inserted through the ring 46', secured to the plate 46, when by a pull on said ring the drawer, containing the table 44, strip $f$, and series of rolls, is drawn out, either partially or completely, as the case may be, the worm-wheel gear 56 disengaging itself from the worm-gear 57 and sliding into gear with it when the drawer is pushed home again.

The recording mechanism may be omitted from the instrument, so that only the indications made by the index-finger or pointer on the scale 4 shall be given; or, vice versa, the dial-plate and pointer may be omitted and the permanent record alone taken.

I claim as my invention—

1. The combination, with a case, a speed-indicating device, and a pivoted segment carried by the case and operatively connected with the said device; of a speed-governor carried by the said case; a stud 20 carried by the case; and a sleeve 19 pivoted on the said stud and provided with levers 18 and 22 arranged at an angle to each other and operatively connected with the said segment and governor respectively, whereby the said indicating device is moved in proportion to the speed of the governor, substantially as set forth.

2. The combination, with a case having an opening and guideways; of a frame slidable through the said opening and in the said guideways, rolls for supporting a recording-strip said rolls being carried by the said frame, a speed-indicating device provided with means for marking the recording-strip, a speed-governor operating and controlling the said device, and means for revolving the said rolls while the said governor is in motion, substantially as set forth.

3. The combination, with a case having an opening and beveled guideways; of a frame slidable through the said opening and provided with a base-plate having beveled edges and slidable in the said guideways, rolls for supporting a recording-strip said rolls being carried by the said frame, a speed-indicating device provided with means for marking the recording-strip, a speed-governor operating and controlling the said device, and means for revolving the said rolls while the said governor is in motion, substantially as set forth.

4. The combination, with a table for supporting a recording-strip; of two rolls 51 and 54 journaled under the said table and also carrying the said strip, means for preventing the roll 51 from revolving too quickly, driving mechanism connected to the roll 54, a pair of rolls 53 53' arranged between and to one side of the said rolls, said roll 53 being provided with projections which engage positively with the said strip, and driving devices connecting the said roll 53 with the roll 54, substantially as set forth.

5. In a speed indicator and register or recorder of the class described, the combination, with a dial-plate secured within an inclosing case or box having a glass top, a graduated scale on said dial, a pointer or index-finger coacting with said scale, a short shaft or arbor on which the pointer or index-finger is secured, a pinion fast on said arbor, a helically-coiled spring acting against the rotation of the pinion, a quadrant or sector engaging with the pinion, an arm secured to said quadrant or sector, a lever engaging with said arm and secured to a sleeve to which is also secured a second lever engaging the sides of an annular groove in a sliding collar, said sliding collar and a confined spiral spring acting thereon, a centrifugal governor connected with said sliding collar and with a sleeve by which it is revolved, a bevel-gear fast on said sleeve and meshing with a bevel-gear on the driving-shaft, of a stud secured to and depending from the quadrant or sector, an arm free to turn on the same stud on which the quadrant turns provided with a slot into which the stud projecting from the quadrant enters, a pencil or marker on the outer end of the pivoted arm, a platform or table against which the pencil or marker presses lightly, a roll for holding a recording-strip, a spring for retarding said roll, a pair of drawing or nipping rolls for drawing the recording-strip over the table, a take-up roll for winding on the strip after it leaves the nipping-rolls, the gearing intervening between the driven drawing-roll and the shaft on which the take-up roll is loosely mounted, a spring-plate fast on said shaft and pressing against one end of the take-up roll to rotate same by frictional contact, a worm-wheel fast on the take-up-roll shaft, a worm-gear engaging with said worm-wheel and fast on a worm-gear shaft at whose opposite end is secured a bevel-gear in mesh with a bevel-gear on a cross-shaft, a worm-wheel gear fast on said cross-shaft, and a worm-gear meshing with the worm-wheel and secured on the driving-shaft of the instrument, substantially as set forth.

6. In a speed indicator and register or recorder of the class described, the combination of a centrifugal governor located within an inclosing case or box, gearing intermediate thereof and a suitable rotating or revolving part of a velocipede or vehicle for giving motion to said governor, the means intervening between the governor and an index-finger or pointer, which transmit the degree of movement of the governor outwardly under centrifugal action to said finger and cause it to advance over a graduated scale indicating the speed or mileage per hour or unit of time that the velocipede or vehicle is traveling, an arm or marker adapted to be actuated by a stud secured to the quadrant or sector and moved through the arc of a circle over a table or platform to varying extents and to trace or mark a line or diagram on a recording-strip drawn over said table and having longitudinal speed-divisions and horizontal distance-divisions marked off thereon, the diagram or zigzag line where it bisects the longitudinal divisions, giving the reading of the speeds attained during a run or drive and the distance traversed by the strip giving the mileage run, the platform or table over which the strip travels and is marked by the pencil, a raised piece pressed out of said table under which the recording-strip is caused to travel to guide and maintain it in a flat and extended condition, a drawer carrying the table and the series of rolls for paying out, drawing and taking up the recording-strip and means for rotating said rolls, and for positively traversing the recording-strip, the lower longitudinal edges of said drawer being beveled or inclined and taking into ways in the bottom of the inclosing box or case, and means for securing said drawer to the case or box, substantially as described.

In testimony whereof I affix my signature in presence of two witnesses.

FERDINAND JOHN WICH.

Witnesses:
FRANCIS JOSEPH JACKSON,
WILLIAM HENRY AMLING.